(12) United States Patent
Este et al.

(10) Patent No.: US 9,260,245 B2
(45) Date of Patent: Feb. 16, 2016

(54) SYSTEM AND METHOD FOR AUTOMATIC STORAGE AND WITHDRAWAL OF PRODUCTS WITH SECURITY RESTRICTIONS

(75) Inventors: Flavio Este, Selvazzano Dentro (IT); Lorenzo Spagna, Guastalla (IT); Roberto Vecchi, Spilamberto (IT)

(73) Assignee: SWISSLOG ITALIA S.P.A., Milan (IT)

( * ) Notice: Subject to any disclaimer, the term of this patent is extended or adjusted under 35 U.S.C. 154(b) by 0 days.

(21) Appl. No.: 14/372,132

(22) PCT Filed: Feb. 24, 2012

(86) PCT No.: PCT/IB2012/050869
§ 371 (c)(1),
(2), (4) Date: Jul. 14, 2014

(87) PCT Pub. No.: WO2013/124714
PCT Pub. Date: Aug. 29, 2013

(65) Prior Publication Data
US 2015/0073585 A1  Mar. 12, 2015

(51) Int. Cl.
*G06F 7/00* (2006.01)
*B65G 1/137* (2006.01)
*G07F 11/16* (2006.01)
*G07F 17/00* (2006.01)

(52) U.S. Cl.
CPC .............. *B65G 1/1373* (2013.01); *B65G 1/137* (2013.01); *G07F 11/165* (2013.01); *G07F 17/0092* (2013.01)

(58) Field of Classification Search
None
See application file for complete search history.

(56) References Cited

U.S. PATENT DOCUMENTS

| 4,267,942 A | 5/1981 | Wick, Jr. et al. |
| 6,711,460 B1 | 3/2004 | Reese |
| 2002/0173875 A1* | 11/2002 | Wallace ............... G06F 19/322 700/242 |

(Continued)

FOREIGN PATENT DOCUMENTS

| EP | 1 813 249 A1 | 8/2007 |
| WO | WO 03/043912 A1 | 5/2003 |

OTHER PUBLICATIONS

Form PCT/ISA/220 Notification of Transmittal of the International Search Report issued in International Application No. PCT/IB2012/050869 in English, date of mailing Nov. 5, 2012 (1 page).

(Continued)

*Primary Examiner* — Yolanda Cumbess
(74) *Attorney, Agent, or Firm* — Flynn, Thiel, Boutell & Tanis, P.C.

(57) ABSTRACT

A system for automatic storage and withdrawal of products, including a storage facility with a plurality of storage locations arranged in rows and columns. A picking arrangement is selectively movable between the plurality of storage locations and a delivery location to pick one or more products contained in selected storage locations and deliver the product(s) to the delivery location according to a selected order. A computer is provided to control movement of the movable picking arrangement according to an order sequence. A number of adjacent storage locations are enclosed in an armored module having armored back, side, and top wall and a front access opening closed by a movable closure which is normally closed and which is selectively opened when the picking arrangement is to pick one or more products contained in any one of the adjacent storage locations within the armored module.

13 Claims, 4 Drawing Sheets

(56) References Cited

U.S. PATENT DOCUMENTS

2005/0002762 A1 1/2005 Gambarelli et al.
2008/0149656 A1 6/2008 Yuyama et al.

OTHER PUBLICATIONS

Form PCT/ISA/210 International Search Report issued in International Application No. PCT/IB2012/050869 in English, date of mailing Nov. 5, 2012 (3 pages).

Form PCT/ISA/237 Written Opinion of the International Searching Authority issued in International Application No. PCT/IB2012/050869 in English, date of mailing Nov. 5, 2012 (4 pages).

Search and Examination Report of the Intellectual Property Office of Singapore issued in Appln. No. 11201403908T dated Jul. 1, 2015 (17 pages).

* cited by examiner

SYSTEM AND METHOD FOR AUTOMATIC STORAGE AND WITHDRAWAL OF PRODUCTS WITH SECURITY RESTRICTIONS

FIELD OF THE INVENTION

The present invention generally relates to a system and a method for automatic storage and withdrawal of products, and was developed with particular regard to a system for the processing of orders within an automated store where several products are subjected to security restrictions.

BACKGROUND

Typical examples of products subjected to security restriction are regulatory controlled drugs, commonly also known as narcotics, in a system for storage and withdrawal of pharmaceutical products. These controlled substances are subjected to strict controls on their storage and withdrawal, which can be effected only by authorized persons under rigid procedural rules, authentication and prescriptions.

In the field of management systems for the automatic storage and retrieval of products, numerous automated stores operating with transfer devices of various types are in fact known. The principal functions which must be performed by such devices are those of receiving an order for the retrieval or the storage of one or more specific products, verifying and selecting the area of the store in which to deposit or retrieve said products, operating the necessary devices so that they move to the locations established according to a particular sequence, actuating the devices so as to withdraw or deposit every product listed in the order to be dealt with and, finally, actuating the devices so that they deposit the withdrawn products at the outlet of the store, or return to the entry of the store to take up a new group of products to be stored.

One of these system for automatic storage and withdrawal of products, particularly but not exclusively pharmaceutical products, is known from WO 03/043912 by the same Applicant, Swisslog Italia S.p.A., whose content is here acknowledged and incorporated by reference.

It is an aim of the present invention to improve the above-mentioned system so that it can accommodate the management of products subjected to security restrictions, such as, but not limited to, controlled substances in a pharmaceutical store.

It is another aim of the present invention to provide a system and a method for the automated delivery of products comprising products subjected to security restrictions, which makes it possible to optimize and speed up the operations of storage and retrieval of these products.

A further aim of the present invention is that of producing a store system which is simple, economic and capable of managing large quantities of objects, without jeopardizing the security measures necessary for the secure storage and delivery of products subjected to security restrictions.

BRIEF SUMMARY OF THE INVENTION

In particular, it is here proposed a system for automatic storage and withdrawal of products, particularly pharmaceutical products, which comprises a storage facility with a plurality of storage locations arranged in rows and columns, and at least one delivery location. The system also comprises picking means which are selectively movable between any one of the plurality of storage locations and the at least one delivery location so as to pick one or more products contained in one or more selected storage locations and deliver them to the delivery location according to a selected order. The system further comprises computer means which control the movement of the movable picking means according to an order sequence available to the computer means. In the proposed system, said plurality of storage locations comprise a number of adjacent storage locations enclosed in an armored module having an armored back wall, armored side walls, an armored top wall and an access front opening closed by a movable closure. The movable closure is normally closed and it is selectively opened just when the picking means are to pick one or more products contained in any one of said number of adjacent storage locations within the armored module.

According to another feature of the proposed system, the number of adjacent locations in the armored module comprise one or more adjacent and/or superimposed shelves having a common front access opening which is commonly closed by said movable closure, which can be a roller shutter.

When the system is provided with a roller shutter, an upper drum is operatively connected to motor means which selectively rotate the drum in one of two rotating directions. The roller shutter is attached at one end to the upper drum so that it can be selectively rolled up onto the drum and lifted when the picking means are to pick one or more products contained in any one of said shelves in the armored module.

According to another feature, the proposed system has locking means which are provided in the lower part of said common front access to selectively lock a lower part of said roller shutter when it is in the closed position, so as to prevent break-in from the bottom part of said common front access.

Preferably, but not exclusively, said locking means comprise engagement means connected to actuator means. The engagement means are adapted to engage a portion of said lower part of the rolled shutter. The actuator means are operatively connected to the computer means of the system and they can be selectively actuated to release the engagement means and allow the opening of said roller shutter.

According to another feature of the proposed system, elongated guide means are provided for guiding the sides of said roller shutter. The guide means comprise bulkhead means disposed along their length to prevent break-in from the sides of the front access to the armored module.

The walls of the armored module are preferably made of removable panels provided with sensor means which detect unauthorized panel removal. The back wall of the armored module also preferably comprises an armored door with an anti-burglar door lock.

The method which is proposed for retrieving the products from the system includes the opening of the movable closure whenever a product has to be retrieved which is located in the armored module, and the closure thereof immediately after the retrieval of the product subjected to security restrictions. According to a particular feature of the proposed method, if a retrieval order comprises a plurality of products subjected to security restrictions, then the picking order is arranged so that the products subjected to security restrictions are all retrieved from the armored module one after the other, the movable closure being only closed immediately after all these products subjected to security restrictions have been retrieved.

The control means of the system, which preferably but not exclusively comprise computer means such as an electronic processor and a database, provide for the authentication of authorized users who are given different access levels in order for them to retrieve products tagged with a certain access level code, or a lower one, and deny them the retrieval of products with a higher access level code. This is particularly useful to deny the access to products stored in the armored module to non-authorized users. The system thus enables the opening of the movable closure of the armored module only if the user is authorized by sufficiently high access level credentials.

BRIEF DESCRIPTION OF THE SEVERAL VIEWS OF THE DRAWINGS

Further characteristics and advantages will become clear from the following detailed description of a preferred exemplary embodiment, with reference to the appended drawings of a system for the automatic storage and retrieval of objects, provided purely by way of non-limiting example, wherein.

DETAILED DESCRIPTION OF THE INVENTION

Figure 1:
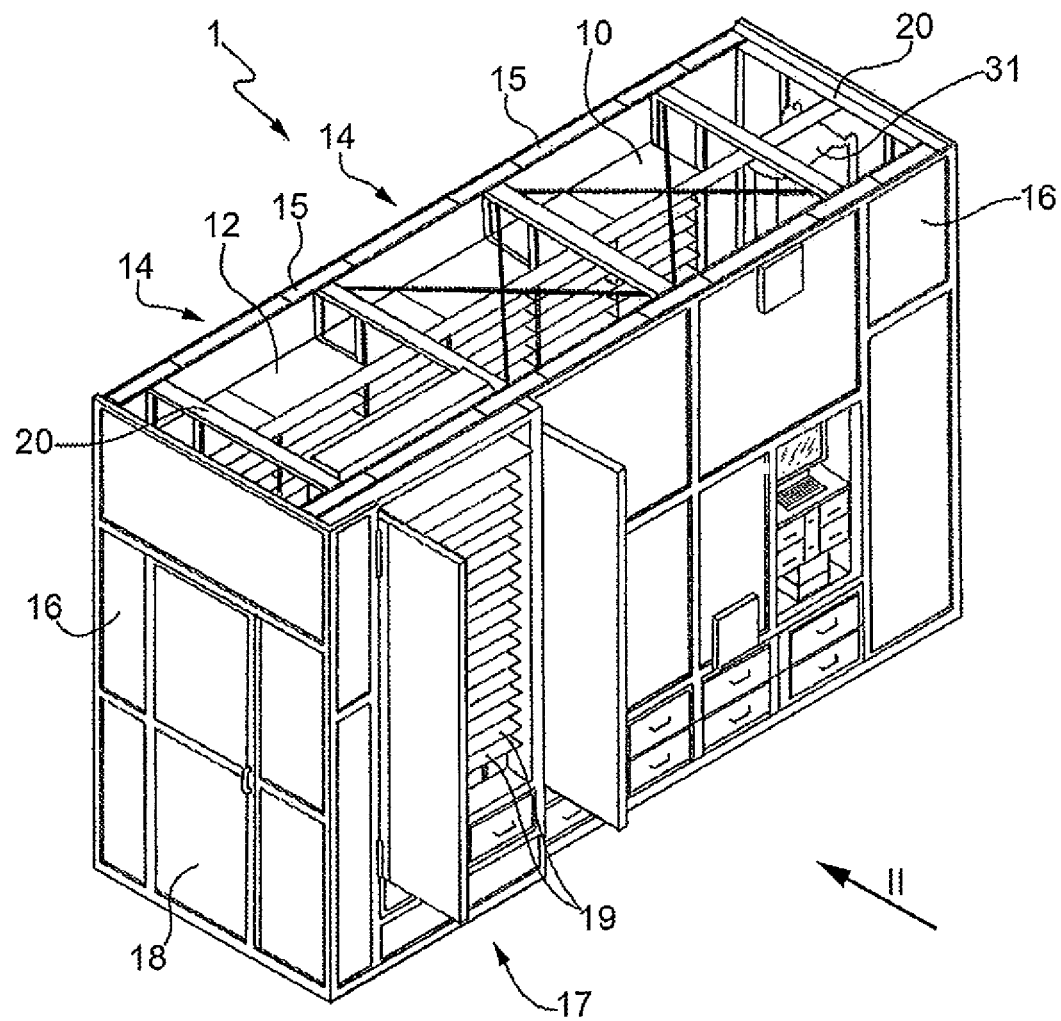
FIG. 1 is a perspective view of a system for the automatic storage and retrieval of products according to the present invention.
Figure 2:
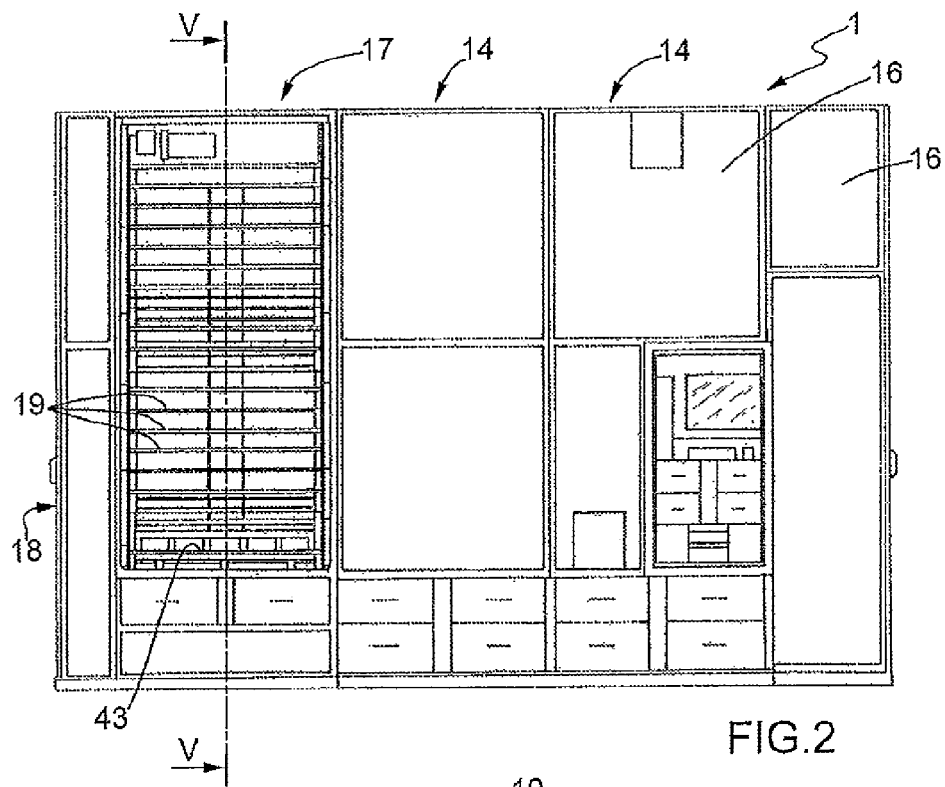
FIG. 2 is an elevation view taken along arrow II of FIG. 1.

With reference now to FIGS. 1 and 2, a product store 1 comprises a pair of racks 10 disposed opposite and at a predetermined distance from each other. Each rack comprises a plurality of parallel shelves 12 defining between them housing areas for storage containers, for example, but not by way of limitation, of the drawer or box type. The whole of the shelves therefore defines a store area containing a plurality of housing areas for storage containers, each definable by two co-ordinates X, Y and by an identification parameter of the rack.

The overall length of the racks 10 is defined by the juxtaposition of modular structures 14, each comprising a supporting frame 15 for the shelves 12. An armored module 17 with shelves 19 has modular dimensions similar to the ones of the modular structures 14 and is located in the product store 1 so as to form part of rack 10 in terms of housing areas for storage containers, with the important differences which will be explained hereinafter.

The product store 1 comprises at least one outlet area and an entry area, provided at some housing areas defined by the shelves of the racks, which can be connected in operation to container transfer systems, such as, for example, a conveyor belt system or a pneumatic despatch system, for transferring the storage containers, used within the store, to further operating stations, or for receiving containers to be used within the store.

It is of course possible also to provide more outlet and entry areas, for example two or more on each rack, as well as transfer systems different from those mentioned above, without thereby departing from the scope of the present invention.

The two racks 10 are supported at their ends by two external frame structures 20, to which generally known devices are connected for moving an elevator member 31, which carries a product transfer device of the known type. The product store 1 is covered by panels 16 and its interior is accessible by means of a door 18 for maintenance purposes and the like.

The product transfer device further comprises picking means of generally known type, such as an arm movably connected to the platform and comprising an anchorage member, for example a suction cup, at one of its ends. The picking arm is capable of withdrawing products contained in one of the storage containers housed in one of the housing areas defined by the shelves 12 in the racks 10 and the shelves 19 in the armored module 17. The picking arm is also capable of depositing the withdrawn products in a collecting container for them to be delivered to an operator. The picking means may of course comprise anchorage means different from those described, without thereby departing from the scope of the present invention.

Figure 3:
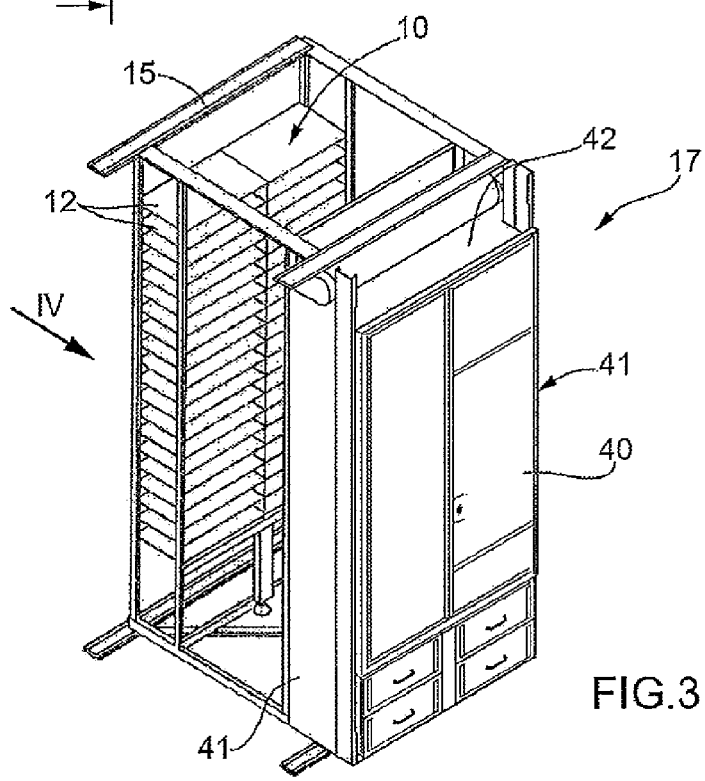
FIG. 3 is a perspective partial view of the system of FIG. 1, showing the armored module in more detail.
Figure 4:
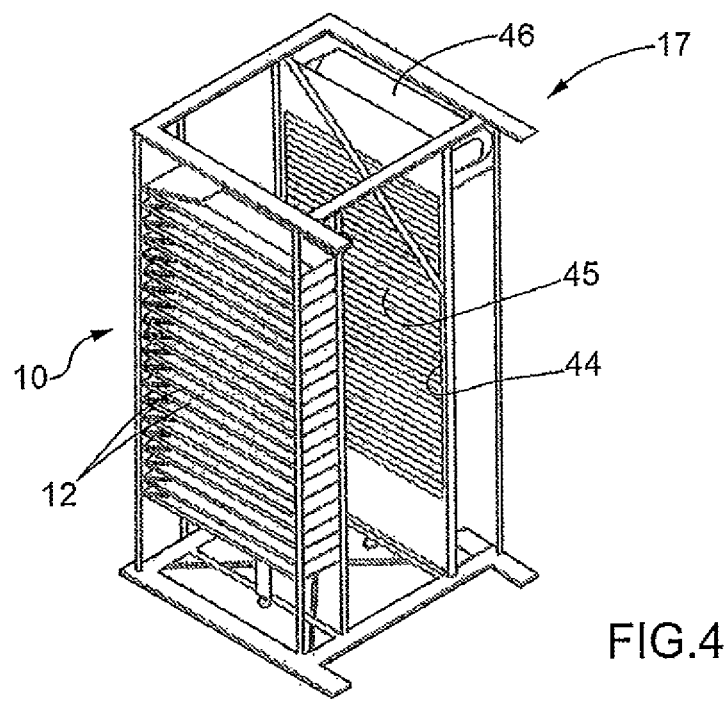
FIG. 4 is a perspective view taken along arrow IV of FIG. 3.
Figure 5:
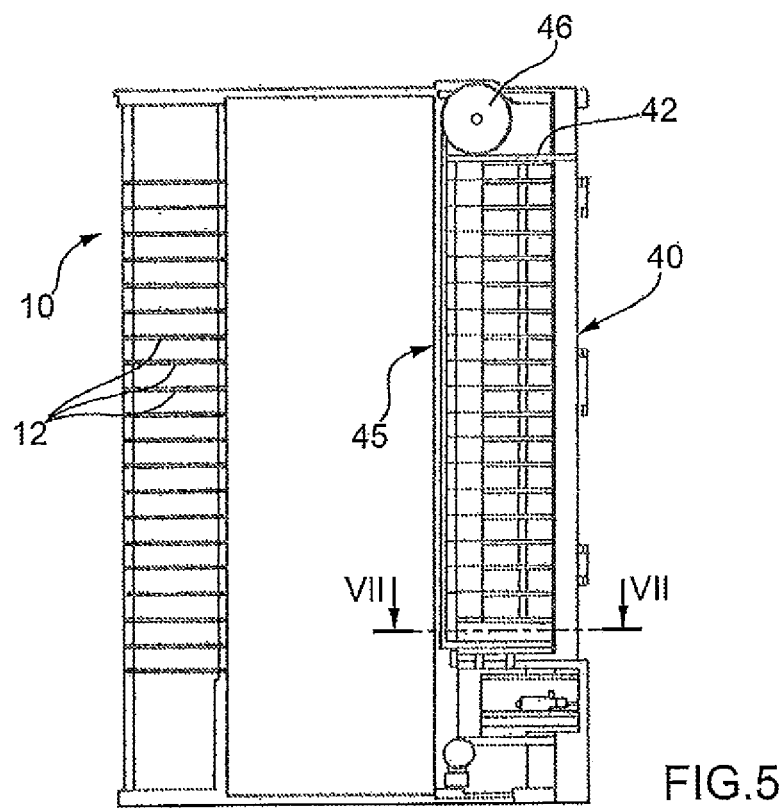
FIG. 5 is a section taken along line V-V of FIG. 2.

With reference now to FIGS. 3 to 5, the armored module 17 comprises an armored access door 40 with an anti-burglar door lock, armored side walls 41 and an armored top wall 42. Preferably the armored module 17 also comprises an armored bottom wall 43 (see FIG. 2). The armored access door 40 is normally closed and can only be opened by authorized personnel for the purpose of checking the content thereof, or for replenishing or retrieving the products subjected to security restrictions in case of failure of the automatic withdrawal system.

With the term "armored wall" it is here indicated a wall specially made to resist to brute force attacks to break in the armored module 17. They can adopt those features known in the field of armored doors, and for example are made of thick, high resistant steel plates or the like. The armored walls can be made by panels which can only be removed by accessing joining members (e.g. bolts or the like) from the inside of the armored module 17.

When the armored access door 40 is closed, it defines an armored back wall for the inner space of the armored module 17 where the shelves 19 are located. On the side opposite to the armored access door 40, the shelves 19 open towards the inner space of the product store 1 where the picking means are located, thus defining an access front opening 44 (see FIG. 4) for the withdrawal of products from the shelves 19.

The access front opening 44 is selectively closed by a movable closure in the preferred form of a roller shutter 45, whose activation is made by a tubular motor 46 located on the top armored wall 42, with a drum around which the rolled shutter 45 can roll up so as to free the access front opening 44 and allow access to the shelves 19 by the picking means. The roller shutter 45 can be made for example of aluminum or tamper-proof steel.

Figure 6:
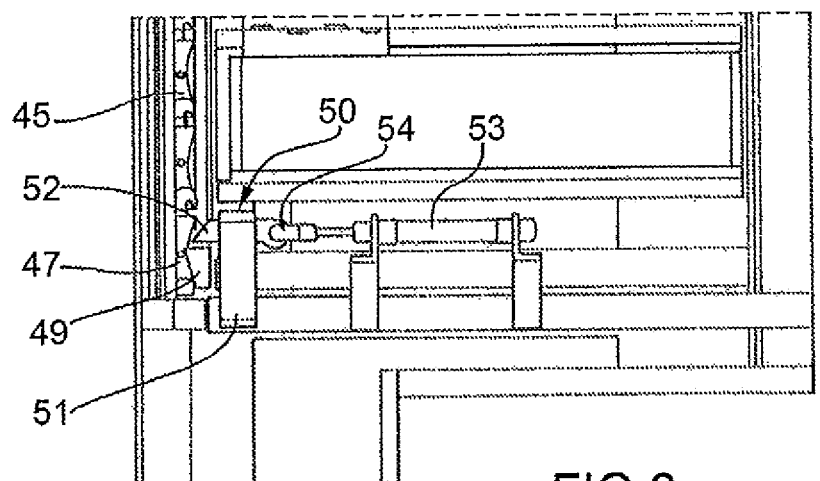
FIG. 6 is an enlarged view of a detail of FIG. 5.
Figure 7:
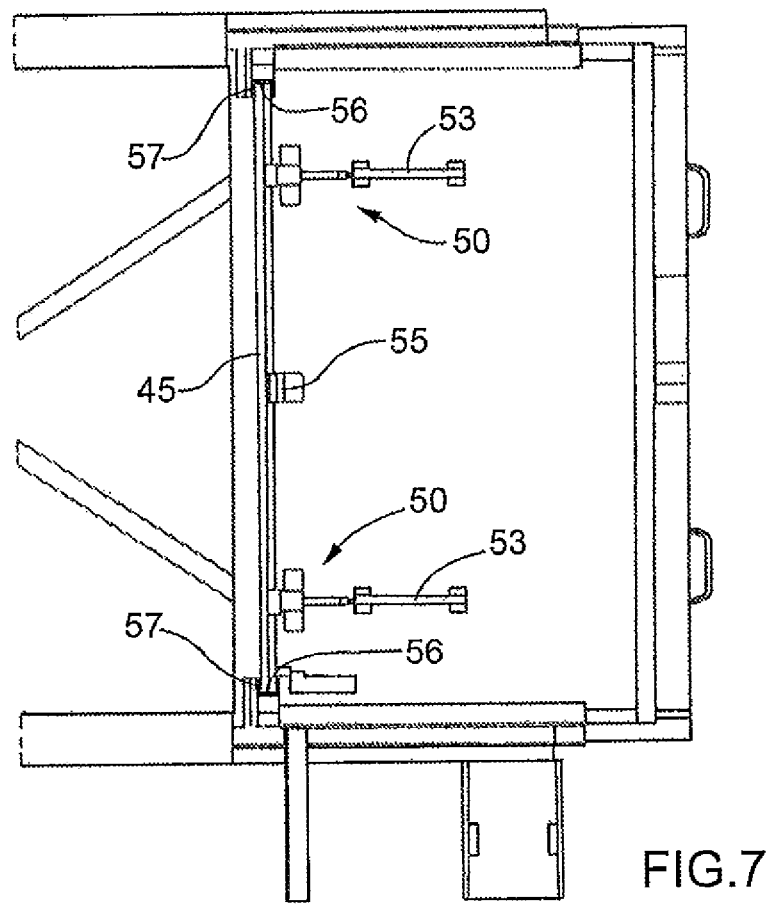
FIG. 7 is a section taken along line VII-VII of FIG. 5.

With reference to FIGS. 6 and 7, the bottom end 47 of the roller shutter 45 is locked in the closed position by a couple of latches 50 comprising a fixed portion 51 which supports a retractable tooth 52 which selectively engages a projection 49 of the bottom end 47 of the roller shutter 45. A rear portion 54 of the tooth 52 is connected to an actuator 53. This locking system prevents a break-in from the bottom part of the roller shutter 45. The locking is actuated through the actuator 53, preferably a pneumatic cylinder or the like, that blocks the roller shutter 45 and relays it only by software control.

A magnetic sensor 55 is provided to sense the opening of the roller shutter 45 and activate an alarm in case the opening is not authorized. Similar sensors, preferably but not exclusively of the magnetic type, are provided on the armored walls and armored door of the armored module 17 to detect an illegal removal thereof.

The roller shutter 45 is guided along its sides by guides 56 which extend linearly from the top to the bottom of the access front opening 44. In order to prevent break-in from the side of the roller shutter 45, thick bulkheads 57 are provided all along the guides 56, on their side which faces the interior of the product store 1 and the picking means.

The system for automatic storage and retrieval of products of the present invention further comprises control means, for example, but not by way of limitation, an electronic processor and a database for the automatic management of the storage, retrieval and general operation of the entire store. In particular, the database comprises a plurality of data concerning the store, for example, but not by way of limitation, the number and location of the shelves 12, the location of the containers within the shelves 12 and the contents of each of them, or the number of free housing areas and their location. The database also comprise a plurality of data specifically concerning the armored module 17, for example the number and location of the shelves 19, the location of the containers within the shelves 19 which are destined to contain products with security restrictions, and the specific product contained in each of them, or the number of free housing areas within the armored module 17 and their location.

The database may be updated at any time, and there may be inserted into it predetermined sequences of retrieval and/or storage in the case of retrieval and/or storage orders recurring frequently. Optionally, the electronic processor may be connected to a data network, to a telephone line or to different means of communication via cable or wireless for receiving and/or communicating information about the store also by remote means.

According to a further embodiment of the present invention, the internal space of the storage containers may be sub-divided by means of separator members of known type into predetermined portions, depending, for example, on the type of product stored. The information regarding such organization of the interior of the containers may be inserted into the database to allow the withdrawal device of the present invention to select a predetermined product within the containers during the withdrawal step.

The database can also contain information about authorized users and credentials thereof for their authentication and selective access to the product store, preferably with different access levels, to distinguish between users who can retrieve all products and users who can retrieve only some of them. Several levels of access can be provided, for example by tagging in the database each product with an access level code, providing each user with a personal access level code, and enabling each authenticated user accessing the system to retrieve only products tagged with the same or lower access level code. Of course, various other implementations of such a selective access can be provided by the software running on the electronic processor. Of particular interest is the possibility to distinguish between users who can access the whole product store, comprising the armored module 19 and who can therefore retrieve also products with security restrictions, and users who can only access products stored on the shelves 12 of the non-armored modules of the product store 1 which are not subjected to security restrictions.

In use, when an order for the retrieval of a predetermined number of products contained in the product store 1 arrives at a system control station, it is inserted, manually or automatically, into the electronic processor, and the system, together with the data contained in the database, proceeds to work out a sequence of retrieval operations for processing the aforesaid order. In the case of a store for pharmaceutical products, the order is for example a prescription for the withdrawal of a number of pharmaceutical products, possibly including regulatory controlled drugs, i.e. products subjected to security restrictions.

By means of a checking process, the control means ascertains whether two or more products with security restrictions, that is, enclosed in the armored module 17, are included in the order, and have therefore to be retrieved from the normally closed armored module 17. In this case, the control means preferably rearranges the sequence of retrieval operations so as to group the retrieval of products with the security restrictions from the armored module, in order to open it only once during the processing of the order, and close it only just after the group of products with security restrictions has been retrieved from the armored module. This way of operating saves time because the opening and closing of the roller shutter happens only once per each processed order. However, should security concerns arise due to the fact that a prolonged opening of the roller shutter might lead to a weakness of the security measures, then the control means can be programmed to provide the complete closure of the roller shutter after the picking of each product (or just a small number of products) with security restrictions from the armored module.

According to a particular advantageous characteristic of the present invention, the store may be loaded automatically by taking advantage of an entry area. New containers full of products to be stored may be transferred from outside to the entry area, and from there the elevator member may position them in free housing areas, making them available for subsequent retrieval operations. Products with security restrictions can be transferred from the entry area to the armored module under strict supervision of authorized personnel, locking them immediately after having being loaded.

According to a further characteristic of the present invention, because the shelves 19 of the armored module 17 define housing areas selectively accessible both from the inside and the outside of the product store, the armored module 17 may be loaded directly from outside through the armored door 40. This characteristic is particularly advantageous in the case of malfunctioning and/or interruption of the entire system, in so far as it renders the storage containers of products with security restrictions equally accessible and retrievable manually from outside from authorized personnel only.

With the principle of the invention remaining the same, the embodiments and details of production of the present invention may of course vary widely with respect to what has been described and illustrated, without thereby departing from the scope of the present invention.

The invention claimed is:

1. A system for automatic storage and withdrawal of products, comprising a storage facility, the storage facility comprising a plurality of storage locations arranged in rows and columns and at least one delivery location, a picking arrangement being selectively movable between any one of the plurality of storage locations and the at least one delivery location so as to pick one or more products contained in one or more selected storage locations and deliver said one or more products to the delivery location according to a received order, a computer for controlling the movement of said picking arrangement according to an order sequence available to the computer, said plurality of storage locations comprising a number of adjacent storage locations enclosed in an armored module having an armored back wall, armored side walls, an armored top wall and a movable armored closure, wherein said movable armored closure is normally closed and is selectively opened at the moment the picking arrangement is to pick one or more products contained in any one of said number of adjacent storage locations within the armored module, wherein each of the adjacent storage locations includes one or more adjacent shelves arranged in one or more vertical stacks, said one or more adjacent shelves having a common front access opening which is commonly closed by said movable armored closure.

2. A system according to claim 1, wherein said movable armored closure is a roller shutter.

3. A system according to claim 2, wherein said roller shutter comprises an upper drum operatively connected to a motor, wherein said motor selectively rotates the upper drum in one of two rotating directions, wherein the roller shutter is attached at one end to the upper drum so that the roller shutter is selectively rolled up onto the upper drum and lifted when the picking arrangement picks one or more products contained in any one of said shelves in the armored module.

4. A system according to claim 2, further comprising an elongated guide arrangement for guiding sides of said roller shutter, said guide arrangement comprising a bulkhead arrangement disposed along a length of said guide arrangement.

5. A system according to claim 3, further comprising a locking arrangement in a lower part of said common front access opening to selectively lock a lower part of said roller shutter when the roller shutter is in a closed position, so as to prevent break-in from a bottom part of said common front access opening.

6. A system according to claim 5, wherein said locking arrangement comprises an engagement member connected to an actuator, wherein the engagement member is adapted to engage a portion of said lower part of said roller shutter, wherein the actuator is operatively connected to said computer such that the actuator is selectively actuated to release the engagement member and allow opening of said roller shutter.

7. A system for automatic storage and withdrawal of products, comprising a storage facility, the storage facility comprising a plurality of storage locations arranged in rows and columns and at least one delivery location, a picking arrangement being selectively movable between any one of the plurality of storage locations and the at least one delivery location so as to pick one or more products contained in one or more selected storage locations and deliver said one or more products to the delivery location according to a received order, a computer for controlling the movement of said picking arrangement according to an order sequence available to the computer, said plurality of storage locations comprising a number of adjacent storage locations enclosed in an armored module having an armored back wall, armored side walls, an armored top wall and an access front opening closed by a movable armored closure, wherein said movable armored closure is normally closed and is selectively opened at the moment the picking arrangement is to pick one or more products contained in any one of said number of adjacent storage locations within the armored module, wherein at least one of said armored back wall, said armored side walls and said armored top wall comprises: a removable panel and a sensor operatively connected to said removable panel to detect an unauthorized panel removal.

8. A system for automatic storage and withdrawal of products, comprising a storage facility, the storage facility comprising a plurality of storage locations arranged in rows and columns and at least one delivery location, a picking arrangement being selectively movable between any one of the plurality of storage locations and the at least one delivery location so as to pick one or more products contained in one or more selected storage locations and deliver said one or more products to the delivery location according to a received order, a computer for controlling the movement of said picking arrangement according to an order sequence available to the computer, said plurality of storage locations comprising a number of adjacent storage locations enclosed in an armored module having an armored back wall, armored side walls, an armored top wall and an access front opening closed by a movable armored closure, wherein said movable armored closure is normally closed and is selectively opened at the moment the picking arrangement is to pick one or more products contained in any one of said number of adjacent storage locations within the armored module, wherein the armored back wall comprises an armored door with an anti-burglar door lock.

9. A method for the automatic storage and withdrawal of products, according to a received order, the products being contained in a system according to claim 1, said method comprising the retrieval of products with security restrictions contained in said armored module of the storage facility, wherein the received order is available to the computer, the method comprising the steps of:
a) identifying the location position of a first one of said one or more products within the storage facility,
b) directing the picking arrangement to the identified location position,
c) if the location position is one of the adjacent location positions enclosed in the armored module, opening the movable armored closure,
d) picking the product with the picking arrangement,
e) if step c) was effected, closing the movable armored closure,
f) repeating steps (a) to (e) for each subsequent product in the received order, and
g) delivering the one or more products to the delivery location.

10. A method according to claim 9, wherein the received order contains the prescription of two or more products with security restrictions enclosed in the armored module, the method comprising a preliminary phase of rearranging the sequence of retrieval operations so as to group the retrieval of products with security restrictions from the armored module, in order to open the armored module only once during the processing of the received order, and close the armored module only just after the group of products with security restrictions has been retrieved from the armored module.

11. A method according to claim 9, wherein the step of opening the movable armored closure is performed to the extent and for the time strictly necessary for the picking arrangement to pick the product or group of products from within the armored module.

12. A method according to claim 9, comprising a preliminary step of authenticating a user, the method further comprising the steps of, for each of the products comprised in the received order: checking whether the authenticated user is authorized to retrieve said product; and enabling or denying the picking of the product with the picking arrangement according to the result of said checking step.

13. A method according to claim 12, wherein each product stored in the armored module has an access level code which is higher than access level codes of products stored outside the armored module.

* * * * *